(12) United States Patent
Henrion

(10) Patent No.: US 7,486,675 B2
(45) Date of Patent: Feb. 3, 2009

(54) NETWORK-UNIT FOR HANDLING MULTICAST MESSAGES

(75) Inventor: Michel André Robert Henrion, Boulogne-Billancourt (FR)

(73) Assignee: ALCATEL, Paris (FR)

( * ) Notice: Subject to any disclaimer, the term of this patent is extended or adjusted under 35 U.S.C. 154(b) by 680 days.

(21) Appl. No.: 10/998,595

(22) Filed: Nov. 30, 2004

(65) Prior Publication Data

US 2005/0122988 A1 Jun. 9, 2005

(30) Foreign Application Priority Data

Dec. 8, 2003 (EP) .................................. 03293065

(51) Int. Cl.
*H04L 12/28* (2006.01)
(52) U.S. Cl. ........................ 370/390; 370/432
(58) Field of Classification Search ........................ None
See application file for complete search history.

(56) References Cited

U.S. PATENT DOCUMENTS 5,724,351 A * 3/1998 Chao et al. ............. 370/395.42
5,844,887 A * 12/1998 Oren et al. .................... 370/218
6,128,292 A * 10/2000 Kim et al. .................... 370/356
6,483,831 B1 * 11/2002 Petersen ....................... 370/380

* cited by examiner

*Primary Examiner*—Frank Duong
(74) *Attorney, Agent, or Firm*—Sughrue Mion, PLLC

(57) ABSTRACT

Network-units (4) comprising multicast driver devices (3) handle multicast messages efficiently by providing the multicast driver devices (3) with memory nodes (1,2) arranged in rows and/or columns, with a memory node (1,2) comprising a memory element (31-33) for memorizing a state of the memory node (1,2). Large numbers of multicast cells/groups like multicast cells and/or multicast groups can be served advantageously. M×N memory nodes (1,2) are arranged in M rows and N columns, with a memory node (1,2) comprising an engagement line (11), an unavailability line (12) and an identification line (13) per row and a request line (21), an acknowledgement line (22) and a selection line (23) per column. A memory element (31,32) memorizes a state indicating a destination port being used for a multicast cell/group, and a further memory element (33) indicates a state requesting a generation of a multicast copy for a destination port, all according to a rule of exclusiveness.

12 Claims, 3 Drawing Sheets

NETWORK-UNIT FOR HANDLING MULTICAST MESSAGES

FIELD OF THE INVENTION

The invention relates to a network-unit for handling multicast messages and comprising a multicast driver device.

BACKGROUND OF THE INVENTION

A prior art network-unit forms part for example of an asynchronous cell switching system, and makes use for example of an internal flow control mechanism like for example an internal dynamic rate-based flow control mechanism, whereby multicast copies are for example generated in an input termination module. Buffers in such an input termination module are structured with per-virtual-ingress-egress-pipe queues and are controlled by a per-virtual-ingress-egress-pipe rate-based scheduler-spacer. Such a network-unit efficiently switches various traffic types, like quality-of-service and non-quality-of-service guaranteed bursty traffic.

The known network-unit is disadvantageous, interalia, due to relatively inefficiently handling multicast messages: multicast copies are merged into the per-virtual-ingress-egress-pipe queue and are scheduled in the per-virtual-ingress-egress-pipes. For relatively large numbers of multicast cells/groups (multicast cells and/or multicast groups), this approach takes relatively much time.

BRIEF SUMMARY OF THE INVENTION

It is an object of the invention, interalia, to provide a network-unit as defined in the preamble which handles multicast messages relatively efficiently.

The network-unit according to the invention is characterised in that the multicast driver device comprises memory nodes arranged in rows and/or columns, with each memory node comprising at least one memory element for memorising at least one state of the memory node.

By introducing memory nodes arranged in rows and/or columns, the multicast driver device has a construction which is optimised for the multicast situation. A memory element memorises a predefined state of the memory node, like for example such a predefined state being active or passive.

An embodiment of the network-unit according to the invention is characterised in that there are M×N memory nodes arranged in M rows and N columns, with a row of N memory nodes indicating a destination port being used for a multicast cell/group, and with a column of M memory nodes requesting a generation of a multicast copy for a destination port.

By applying the row of N memory nodes, the fact that a destination port is used for a multicast cell/group or not is indicated. By applying the column of M memory nodes, a generation of a multicast copy for a destination port is requested.

A multicast cell may for example refer to an asynchronous transfer mode cell bound to a multicast group. A multicast group may for example refer to means whereby a multicast group address is assigned to a multicast group, means whereby hosts wishing to be part of a multicast group join a multicast group, hosts wishing to end its membership leave a multicast group or switch from one group to another.

An embodiment of the network-unit according to the invention is characterised in that at least one memory node comprises:

an engagement line, an unavailability line and an identification line per row; and a request line, an acknowledgement line and a selection line per column.

The engagement line is a row input line, and the unavailability line and the identification line are row output lines. The request line is a column output line, and the acknowledgement line and the selection line are column input lines. These lines are used advantageously in combination with the one or more memory elements and some logical circuitry.

An embodiment of the network-unit according to the invention is characterised in that the memory element memorises a state indicating a destination port being used for a multicast cell/group. This memory element is used advantageously in combination with the lines defined before and for example five logical gates.

An embodiment of the network-unit according to the invention is characterised in that a further memory element indicates a state requesting a generation of a multicast copy for a destination port. This further memory element is used advantageously in combination with the memory element and the lines defined before and for example three logical gates.

An embodiment of the network-unit according to the invention is characterised in that at least one memory node further comprises:

an in-progress or busy line per row.

By introducing the in-progress or busy line being a row output line, more information about the row is generated advantageously.

An embodiment of the network-unit according to the invention is characterised in that at least one memory node further comprises:

a request-acknowledged line per row; and an enforce-multicast-cell/group-priority line per column.

By introducing the request-acknowledged line being a row input line and the enforce-multicast-cell/group-priority line being a column output line, more information about the column is generated advantageously. Further, an additional policy is introduced advantageously.

The invention further relates to a multicast driver device for use in a network-unit for handling multicast messages.

The multicast driver device according to the invention is characterised in that the multicast driver device comprises memory nodes arranged in rows and/or columns, with each memory node comprising at least one memory element for memorising at least one state of the memory node.

The invention yet further relates to a method for driving the handling of multicast messages.

The method according to the invention is characterised in that the method comprises the steps of memorising at least one state of at least one memory node of memory nodes arranged in rows and/or columns.

The invention also further relates to a processor program product for driving the handling of multicast messages.

The processor program product according to the invention is characterised in that the processor program product comprises the functions of memorising at least one state of at least one memory node of memory nodes arranged in rows and/or columns.

Embodiments of the multicast driver device according to the invention and of the method according to the invention and of the processor program product according to the invention correspond with the embodiments of the network-unit according to the invention.

The invention is based upon an insight, interalia, that, according to a rule of exclusiveness, each destination port can receive only one request at a point in time from one multicast cell/group for generating a multicast copy for that destination port, and is based upon a basic idea, interalia, that, according to the rule of exclusiveness, the multicast driver device is to be provided with memory nodes arranged in rows and/or columns.

The invention solves the problem, interalia, to provide a network-unit which handles multicast messages relatively efficiently, and is advantageous, interalia, in that large numbers of multicast cells/groups can be served.

It is to be noticed that the term 'comprising', also used in the claims, should not be interpreted as being restricted to the means listed thereafter. Thus, the scope of the expression 'a device comprising means A and B' should not be limited to devices consisting only of components A and B. It means that with respect to the present invention, the relevant components of the device are A and B.

Similarly, it is to be noticed that the term 'coupled', also used in the claims, should not be interpreted as being restricted to direct connections only. Thus, the scope of the expression 'a device A coupled to a device B' should not be limited to devices or systems wherein an output of device A is directly connected to an input of device B. It means that there exists a path between an output of A and an input of B which may be a path including other devices or means.

BRIEF DESCRIPTION OF THE DRAWINGS

The above and other objects and features of the invention will become more apparent and the invention itself will be best understood by referring to the following description of an embodiment taken in conjunction with the accompanying drawings wherein.

DETAILED DESCRIPTION OF AN EXEMPLARY EMBODIMENT OF THE INVENTION

Figure 1:
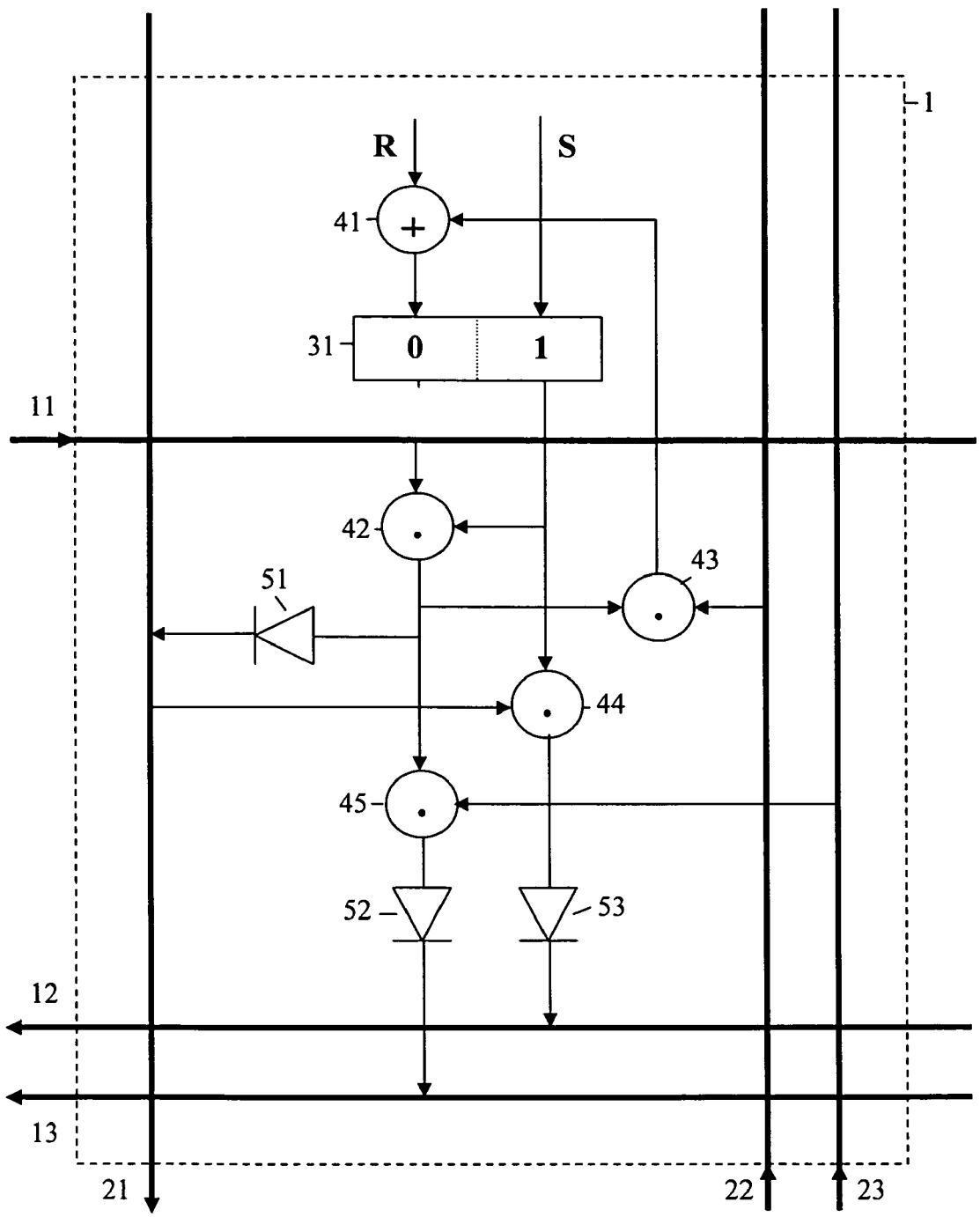
FIG. 1 shows in block diagram form a first memory node for a multicast driver device according to the invention.

The block diagram of a first memory node 1 as shown in FIG. 1 for a multicast driver device 3 according to the invention comprises an engagement line 11, an unavailability line 12 and an identification line 13 per row and a request line 21, an acknowledgement line 22 and a selection line 23 per column. The engagement line 11 is a row input line, and the unavailability line 12 and the identification line 13 are row output lines. The request line 21 is a column output line, and the acknowledgement line 22 and the selection line 23 are column input lines.

A memory element 31 memorises a state indicating a destination port being used for a multicast cell/group or not, with the multicast cell/group being either a multicast cell or a multicast group. A multicast cell is for example an asynchronous transfer mode cell. A multicast group is for example a group of terminals and/or indicates one or more numbers of destinations. A first input of the memory element 31 is coupled to an output of an OR-gate 41, of which a first input receives an R-signal. A second input of the memory element 31 receives an S-signal. An output of the memory element 31 is coupled to a first input of a first AND-gate 42, of which a second input is coupled to the engagement line 11. An output of the first AND-gate 42 is coupled to a first input of a second AND-gate 43 and to an input of a diode 51. A second input of the second AND-gate 43 is coupled to acknowledgement line 22, and an output of the second AND-gate 43 is coupled to a second input of the OR-gate 41. An output of the diode 51 is coupled to the request line 21. A first input of a third AND-gate 44 is coupled to the output of the memory element 31, and a second input of the third AND-gate 44 is coupled to the request line 21. An output of the third AND-gate 44 is coupled to an input of a diode 53, of which an output is coupled to the unavailability line 12. A first input of a fourth AND-gate 45 is coupled to an output of the first AND-gate 42, and a second input of the fourth AND-gate 45 is coupled to the selection line 23. An output of the fourth AND-gate 45 is coupled to an input of a diode 52, of which an output is coupled to the identification line 13.

The engagement line 11 for example corresponds with a Multicast Cell Engaged (MCE) input common line. The unavailability line 12 for example corresponds with a Multicast Group Unavailable (MGU) output common line. The identification line 13 for example corresponds with a Multicast Group Identification (MGI) output common line. The request line 21 for example corresponds with a Multicast Cell Copy Execution Request (MCCER) output common line. The acknowledgement line 22 for example corresponds with a Multicast Cell Copy Execution Acknowledgement (MCCEA) input common line. The selection line 23 for example corresponds with a Destination Port Select (DPS) input common line.

The memory element 31 for example corresponds with a Dependency/Request Memory Element (DRME). The memory element 31 is set in zero or one, via classical memory writing technique (inputs R and S), when the dependency states of a particular multicast group (reflecting whether each given destination port belongs or not to a subset of destination ports) are loaded in a row of the multicast driver device 3.

The first AND-gate 42 delivers an active output, to the request line 21 via the decoupling diode 51, if the engagement line 11 is active and if the memory element 31 is in one. The output of this first AND-gate 42 thus indicates, when active, that the memory node 1 requests the generation of a multicast copy for the destination port corresponding to its column, because its memory element 31 is active and because its engagement line 11 indicates that its multicast cell is activated for execution. The third AND-gate 44 delivers an active output, to the unavailability line 12 via the decoupling diode 53, if the request line 21 is active and if the memory element 31 is in one. The output of this third AND-gate 44 thus indicates, when active, that the row of that memory node 1 is held unavailable because its memory element 31 is active in one and because a request is currently engaged for the destination port corresponding to its column. A fifth AND-gate 45 delivers an active output, to the identification line 13 via the decoupling diode 52, if the selection line 23 is active and if the output of the first AND-gate 42 is active in one. The output of this fifth AND-gate 45 thus indicates, when active, that the row of that memory node 1 is identified, because the memory node 1 detects that its column is selected for identification and because it is the single one currently activating a request on its column. The second AND-gate 43 delivers an active output, to the reset input of the memory element 31 via the OR-gate 41, if the acknowledgement line 22 is active and if the output of the first-AND gate 42 is active in one. The output of this second AND-gate 43 thus indicates, when active, that the memory element 31 of the memory node 1 has to be reset in zero, because it detects that its column receives a request acknowledgement and because it is the single one currently activating a request on its column.

Additionally, a fourth common line per row, called Multicast Cell. In Progress (MCIP) output common line (not shown in FIG. 1), can be provided if needed to signal out the "used" condition of a row, as long as at least one of the memory nodes of the row has an active "port dependency status" or "execution request status", the current status being known externally depending on the "ready" or "active" state of the row. For doing so, the one output of the memory element 31 activates such a MCIP common line via an additional decoupling diode. Furthermore, if a "minimal pre-emptive multicast" policy is used, two additional common lines are provided, one First Request Acknowledged (FRA) input common line per row and one Enforce Multicast Cell Priority (EMCP) output common line per column. The row activates its FRA common line when it is in First Request Acknowledged state (this state, memorised at row level, being set active when the row receives the first active identification signal on its identification line 13. In each memory node, one additional AND-gate activates the EMCP output common line if the FRA input common line is active and if its memory element 31 is active in one.

It is to be noted that, in FIG. 1, the unavailability line 12 signals out, when active, an unavailability condition of its row in all situations where its memory element is active in one and the request line 21 is active on its column, i.e. irrespective whether this row is temporarily blocked by another row or is itself busy by activating its own request. If a different unavailability signal would be preferred such that it would be strictly active only in case of a blocking condition by another row, one should add, to the third AND-gate 44, a third input connected to the engagement line 11 via an inverter, so that the output of this third AND-gate 44 could be active only when the engagement line 11 is not active, i.e. when the memory node 1 is not itself activating its own request.

As a variant, as concerns the second AND-gate 43 controlling the reset input of the memory element 31, instead of connecting one of its two inputs to the output of the first AND-gate 42, it would be equivalent to connect this input to the engagement line 11. Effectively, in such a variant, on a column where the acknowledgement line 22 is activated, all the memory nodes 1 currently engaged in execution (i.e. having their engagement line 11 currently active on their row) would generate a reset of their memory element 31, but this effect would be actually resetting (from one) to zero only the memory element 31 of the single memory node 1 which is currently requesting, any other memory node 1 currently in engaged in execution on this column having necessarily its memory element 31 currently in zero.

As a variant, a different fourth common line per row, called Multicast Cell Busy (MCB) output common line (not shown in FIG. 1), can be provided if needed to strictly signal out the "busy" condition of a row, as long as at least one of the memory nodes 1 of the row has an active "execution request status". For doing so, one additional AND-gate activates such a MCB common line via one additional decoupling diode, this AND-gate having one input connected to the one output of the memory element 31 and another input connected to the engagement line 11.

Figure 2:
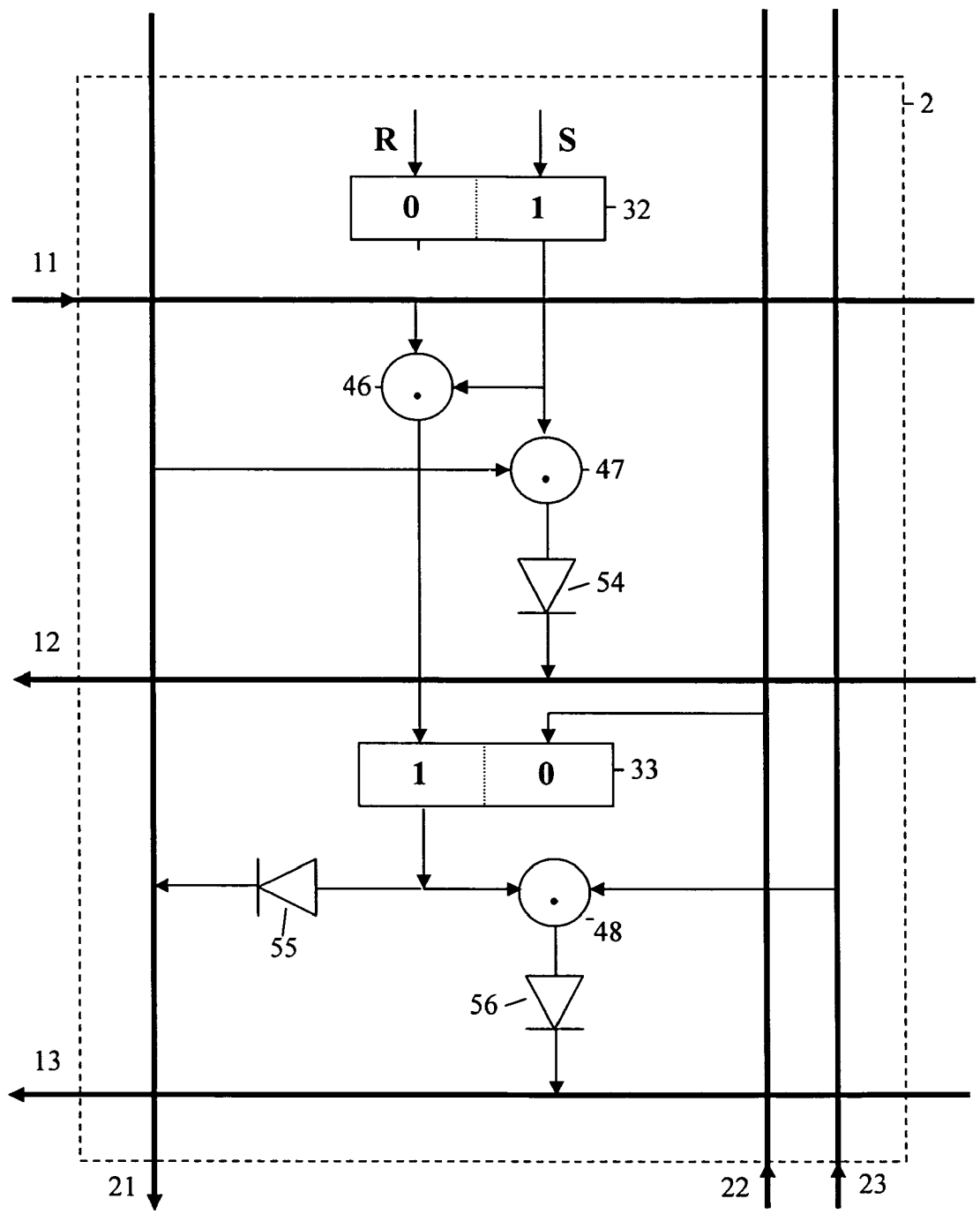
FIG. 2 shows in block diagram form a second memory node for a multicast driver device according to the invention.

The block diagram of a second memory node 2 as shown in FIG. 2 for a multicast driver device 3 according to the invention comprises an engagement line 11, an unavailability line 12 and an identification line 13 per row and a request line 21, an acknowledgement line 22 and a selection line 23 per column. The engagement line 11 is a row input line, and the unavailability line 12 and the identification line 13 are row output lines. The request line 21 is a column output line, and the acknowledgement line 22 and the selection line 23 are column input lines.

A memory element 32 memorises a state indicating a destination port being used for a multicast cell/group or not, with the multicast cell/group being either a multicast cell or a multicast group. A further memory element 33 indicates a state requesting a generation of a multicast copy for a destination port. A first input of the memory element 32 receives an R-signal. A second input of the memory element 32 receives an S-signal. An output of the memory element 32 is coupled to a first input of a sixth AND-gate 46, of which a second input is coupled to the engagement line 11. An output of the sixth AND-gate 46 is coupled to a first input of the further memory element 33, of which a second input is coupled to the acknowledgement line 22. The output of the memory element 32 is further coupled to a first input of a seventh AND-gate 47, of which a second input is coupled to the request line 21. An output of the seventh AND-gate 47 is coupled to an input of a diode 54, of which an output is coupled to the unavailability line 12. A second input of the further memory element 33 is coupled to the acknowledgement line 22. An output of the further memory element 33 is coupled to an input of a diode 55 and to a first input of an eighth AND-gate 48, of which a second input is coupled to the selection line 23. An output of the eighth AND-gate 48 is coupled via a diode 56 to the identification line 13. An output of the diode 55 is coupled to the request line 21.

The engagement line 11 for example corresponds with an Engage Multicast Cell (EMC) input common line. The unavailability line 12 for example corresponds with a Multicast Group Unavailable (MGU) output common line. The identification line 13 for example corresponds with a Multicast Cell Identification (MCI) output common line. The request line 21 for example corresponds with a Multicast Cell Copy Execution Request (MCCER) output common line. The acknowledgement line 22 for example corresponds with a Multicast Cell Copy Execution Acknowledgement (MCCEA) input common line. The selection line 23 for example corresponds with a Destination Port Select (DPS) input common line.

The memory element 32 for example corresponds with a Dependency Memory Element (DME) and the further memory element 33 for example corresponds with a Request Memory Element (RME).

In FIG. 2, the Engage Multicast Cell (EMC) input common line per row explicitly indicates, when active, that the multicast cell in "ready" state has to move to the "active" state. By comparison, in FIG. 1, the Multicast Cell Engaged (MCE) input common line per row explicitly indicates, when active, that the multicast cell is actually engaged for execution, thus in the "active" state. Thus, in FIG. 2, the EMC line of a row is here activated to control the transition, in the relevant memory nodes, from the "port dependency status" to the "execution request status" (which is then held by the further memory element 33 of the memory nodes 2 whose memory element 32 is in one), while the MCE line of a row in FIG. 1 is held activated to control the active condition of the row until all the required copies of the multicast cell have been generated. The five other common lines (MGU, MCI, MCCER, MCCEA, DPS) are functionally identical to those of FIG. 1. In FIG. 2, the memory element 32 is set in zero or one, via classical memory writing technique (inputs R and S), when the dependency states of a particular multicast group (reflecting whether each given destination port belongs or not to a subset of destination ports) are loaded in a row of the multicast driver device 3.

The sixth AND-gate 46 delivers an active output, to the set input of the further memory element 33 if the memory element 32 is active in one and if the engagement line 11 is active. The engagement line 11 of a row thus allows to control the move from an active "port dependency status" to an active "execution request status", by copying (the content of) the memory element 32 into the further memory element 33. Then, when the further memory element 33 is in one, it directly activates the request line 21 via the decoupling diode 55. The one output of the further memory element 33 thus explicitly indicates, when active, that the memory node 2 requests the generation of a multicast cell copy for the destination port corresponding to its column. The seventh AND-gate 47 delivers an active output, to the unavailability line 12 via the decoupling diode 54, if the request line 21 is active and if the memory-element 32 is in one. The output of this seventh AND-gate 47 thus indicates, when active, that the row of that memory node 2 is held unavailable because its memory-element 32 is active in one and because a request is currently engaged for the destination port corresponding to its column. The eighth AND-gate 48 delivers an active output, to the identification line 13 via the decoupling diode 56, if the selection line 23 is active and if the further memory element 33 active in one. The output of this eighth AND-gate 48 thus indicates, when active, that the row of that memory node 2 is identified, because the memory node 2 detects that its column is selected for identification and because it is the single one currently activating a request on its column. The further memory element 33 is reset to zero when detecting that the acknowledgement line 22 is activated on its column.

Compared with the previous memory node 1, the complexity of the memory node 2 is not much different, but it offers additional advantages, as described later.

Besides, a fourth common line per row, called Multicast Cell Busy (MCB) output common line (not shown in FIG. 2), can be provided if needed in a memory node 2 to signal out the "busy" condition of a row as long as at least one of the memory nodes 2 of the row remains engaged in a request for cell copy. For doing so in FIG. 2, in each memory node 2, the one output of the further memory element 33 activates such a MCB common line via one additional decoupling diode. At row level, the detection that the MCB line is no longer active indicates that the execution of all requests for the active multicast cell is finished.

Furthermore, if a "minimal pre-emptive multicast" policy is used, two additional common lines are provided, one First Request Acknowledged (FRA) input common line per row and one Enforce Multicast Cell Priority (EMCP) output common line per column. The row activates its FRA common line when it is in First Request Acknowledged state (this state, memorised at row level, being set active when the row receives the first identification signal on its identification line 13), and, in each memory node 2, one additional AND-gate activates the EMCP output common line if the FRA input line is active and if its further memory element 33 is active in one.

Instead of performing a straight copy of both zero and one conditions of the memory element 32, it is sufficient to copy the one condition, since the further memory element 33 has been already reset to zero after its previous request has been acknowledged.

As for FIG. 1, it is to be noted that, in FIG. 2, the unavailability line 12 signals out, when active, an unavailability condition of its row when its memory element 32 is active in one and if the request line 21 is active on its column, i.e. irrespective whether this row is temporarily blocked by another row or is itself busy by activating its own request. If a different unavailability signal would be preferred such that it would be strictly active only in case of a blocking condition by another row, one should add, to the seventh AND-gate 47, a third input connected to the one input of the further memory element 33 via an inverter, so that the output of this seventh AND-gate 47 could be active only when the further memory element 33 is not active, i.e. when the memory node 2 is not itself activating its own request.

As concerns the direct use of the acknowledgement line 22 for controlling the reset input of further memory element 33, as in FIG. 2, it is to be noted that, on a column where the acknowledgement line 22 is activated, all the memory nodes 2 do reset their further memory element 33, but this effect is actually resetting (from one) to zero only the further memory element 33 of the single memory node 2 which is currently requesting, any other memory node 2 on this column having necessarily its further memory element 33 currently in zero.

Figure 3:
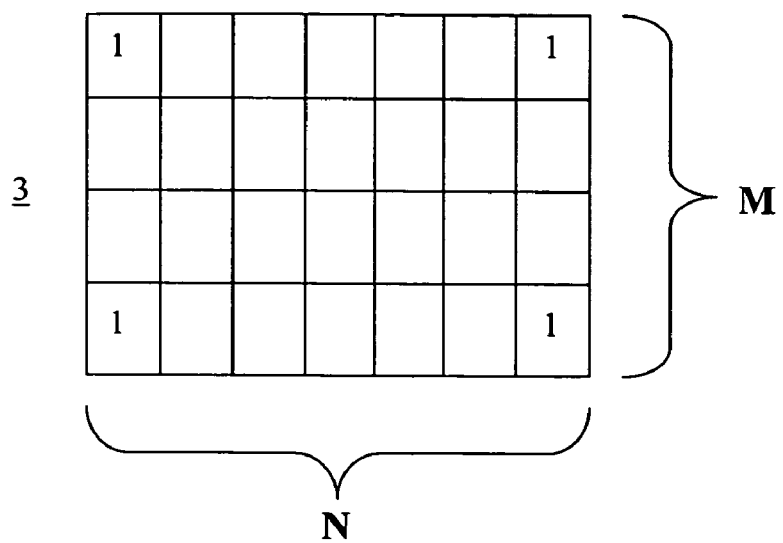
FIG. 3 shows in block diagram form a multicast driver device according to the invention.

The block diagram of the multicast driver device 3 according to the invention as shown in FIG. 3 comprises M×N memory nodes 1 (alternatively 2), M rows and N columns. For the sake of clarity, only the memory nodes in the corners have got their number 1 (alternatively 2). These memory nodes 1,2 correspond with the memory nodes 1,2 as shown in FIG. 1,2.

Figure 4:
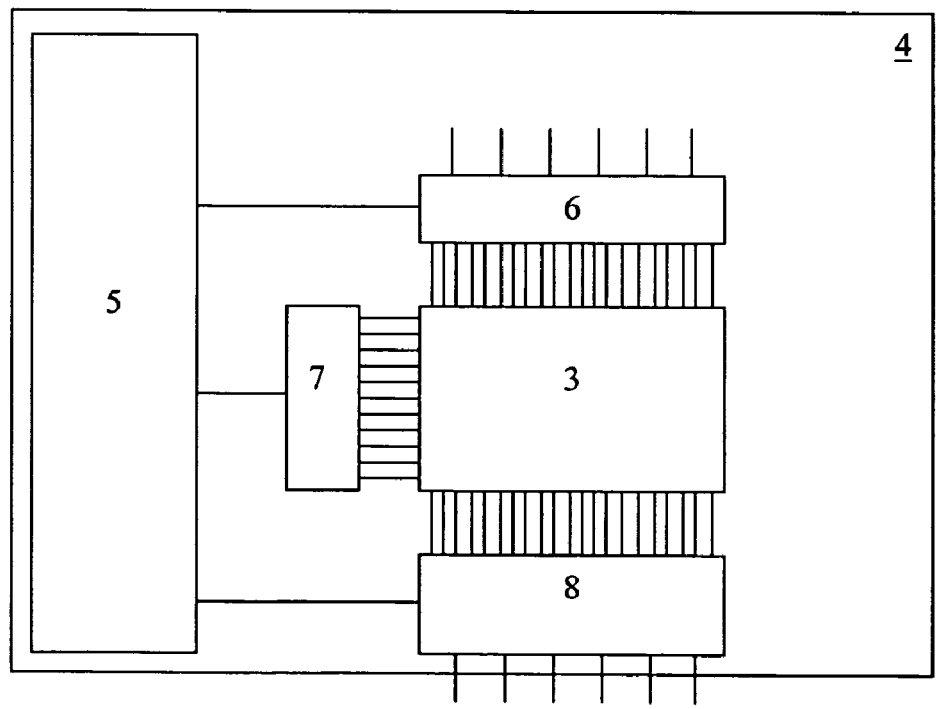
FIG. 4 shows in block diagram form a network-unit according to the invention.

The block diagram of the network-unit 4 according to the invention as shown in FIG. 4 comprises the multicast driver device 3 as shown in FIG. 3. This multicast driver device is for example located between a first column interface 6 and a second column interface 8 both coupled to the column lines 21-23. Further, the multicast driver device is for example coupled to a row interface 7 coupled to the row lines 11-13. A processor-system 5 may control the multicast driver device 3, and the interfaces 6-8. Both column interfaces 6,8 may be combined, and (parts of) the interfaces 6-8 may be integrated into the multicast driver device 3 and/or into the processor-system 5. Further, (parts of) this processor-system 5 may be integrated into the multicast driver device 3 or vice versa. Finally, each interface 6-8 may be located outside the network-unit 4.

A further benefit is that the time incurred for servicing all the N multicast cell copies of one multicast cell can be bounded by a maximum multicast cell copying delay, thus allowing to engineer the expected performance of multicast traffic. Three applications of the multicast driver device 3 are presented as regards the arrangement used for queuing the multicast cells. In Application A1, the multicast driver device 3 is capable of internally handling one multicast cell per multicast group, thus implying multicast cell queuing per multicast group outside of the multicast driver device 3. In Application A2, the multicast driver device 3 is capable of internally handling in overlap two multicast cells per multicast group, thus still implying multicast cell queuing per multicast group outside of the multicast driver device 3. In Application B, the multicast driver device 3 itself is capable of internally handling multicast cell queuing per multicast group, without necessarily implying multicast cell queuing per multicast group outside of the multicast driver device 3, thus only requiring bulk multicast cell queuing (one common multicast queue) outside of the multicast driver device 3.

Two main alternative options are conceivable for using a multicast driver device 3, depending on the way to associate the M rows of its Multicast Cell Handling Array (MCHA array) comprising M×N Multicast Handling Memory Nodes (MCMN) arranged in M rows and N columns, namely: A) Either the M rows are associated to M possible multicast groups, each row being dedicated to one particular multicast group. Then the M dimension of the MCHA array depends on the engineered number of different multicast groups. B) Or the M rows are dynamically associated to M concurrent multicast cells, each row being in charge of a multicast cell for any multicast group (so that several concurrent multicast cells may belong to the same multicast group). Then the M dimension of the MCHA array depends on the engineered number of multicast cells to be concurrently handled in the multicast driver device 3.

In the first option A (corresponding to above mentioned Application A), for a given multicast group supported by one single dedicated row, the multicast driver device 3 cannot accept for queuing many multicast cells relating to that same multicast group. In this case, multicast cell queuing per multicast group is required outside of the multicast driver device 3. There can be two variants of option A depending on the specific solution (FIG. 1 or 2) considered for realising the multicast driver device 3. A version A1 (cf. above mentioned Application A1) capable of handling only one multicast cell (the first multicast cell from the head of the external queue per multicast group), either in 'active' state (when request for execution is engaged) or in 'ready' state (when waiting for the availability of the related multicast group), and a version A2 (cf. above mentioned Application A2) capable of handling two multicast cells (the first two multicast cells from the head of the external queue per multicast group) in overlapping states, the second multicast cell being in 'ready' state while the first one is in 'active' state. In the second version B (corresponding to above mentioned Application B), for a given multicast group supported by any number of rows per multicast cell, the multicast driver device 3 can accept for queuing many multicast cells relating to that same multicast group. In that case, multicast cell queuing per multicast group can be avoided outside of the multicast driver device 3, by supplementing each row of the multicast driver device 3 with an additional linked-list memory word (pointing to the next row in list) allowing to manage the queuing sequence of multicast cells (i.e. rows where they are queued) for each multicast group. Multicast cell queuing per multicast group is then integrated within the multicast driver device 3 itself. If required, the capacity of the multicast driver device 3 (M concurrent multicast cells) can be backed up by an up-front bulk multicast queue (common to all multicast cells) which feeds the multicast driver device 3.

The respective adequacy of FIGS. 1 and 2 for MCMN memory nodes for potential Application types A and B of the multicast driver device 3, is as follows. In Applications type A, the M rows of the MCHA array are associated to M possible multicast groups, each row being dedicated to one particular multicast group. In a multicast driver device 3 based on MCMN1 memory nodes (as per FIG. 1): One row per multicast group can only handle one single multicast cell (either in 'active' state or in 'ready' state) for the assigned multicast group, i.e. as for Application A1. Besides, although a given row remains semi-permanently assigned to one given multicast group, the related 'relevancy' data should be reloaded for each new multicast cell (from an external RAM memory storing these data) in the memory nodes of its row (since all its memory elements in 1 are reset to 0 one by one when the corresponding request for cell copy is acknowledged).

In a multicast driver device 3 based on MCMN2 memory nodes (as per FIG. 2): One row per multicast group can handle either only one multicast cell (either in 'active' state or in 'ready' state), as for Application A1 or even two consecutive multicast cells in overlap (the first one in 'active' state using the RME memory elements and the following one in 'ready' state using the DME memory elements) for the assigned multicast group, i.e. as for Application A2. Besides, as a given row remains semi-permanently assigned to one given multicast group, the related 'relevancy' data do not need to be reloaded for each new multicast cell in the memory nodes of its row (thus avoiding an external RAM memory for storing these data), since all the appropriate 'relevancy' data of the multicast group remain loaded in DME memory elements of the MCMN2 memory nodes of the corresponding row (while all its RME memory elements in 1 are reset to 0 one by one when the corresponding request for cell copy is acknowledged).

Compared to FIG. 1, a multicast driver device 3 based on MCMN2 memory nodes (as per FIG. 2) for Application type A thus shows a two-fold advantage: No reloading of the 'relevancy' data of the semi-permanently assigned multicast group at each multicast cell in Application A1 or A2, and subsequently no need for an external RAM memory for storing these data. Higher efficiency of the device for handling consecutive multicast cells for the same multicast group in Application A2, thanks to the look-ahead capability whereby the following multicast cell (following the one currently in 'active' state) can be placed in 'ready' state while the previous one in 'active' state is handled. Accordingly, placing the following multicast cell in the device can be performed with much less real time constraints, and moving that following multicast cell from 'ready' state to 'active' state (as soon as the multicast group becomes available) can be executed faster.

Although such applications A1 and A2 require external queuing per multicast group, some optimisation of the execution time for moving to the next multicast cell (especially with FIG. 1) could be achieved by supplementing each row (corresponding to a multicast group) with the start_of_list pointer of the related queue as an additional memory word per row integrated in the multicast driver device 3. Then, when an active multicast cell has finished its copy generation, the start_of_list pointer of that row directly leads to the identity of the next multicast cell for that multicast group. In comparison, keeping the start_pf_list pointer outside of the multicast driver device 3 would require to identify the multicast group corresponding to the row of this finishing active multicast cell, and then select the start_of_list pointer of that multicast group in a separate table.

In Application type B, the M rows of the MCHA array are dynamically associated to M concurrent multicast cells, each row being in charge of a multicast cell for any multicast group, such that several concurrent multicast cells may belong to the same multicast group. In a multicast driver device 3 based on MCMN1 or MCMN2 memory nodes (as per FIG. 1 or 2 respectively): One row only handles one single multicast cell (either in 'active' state or in 'ready' state) for any multicast group. Besides, as a given row is not assigned to one given multicast group, the related 'relevancy' data is reloaded in the memory nodes of its row for each new multicast cell. So, compared to FIG. 1, a multicast driver device 3 based on MCMN memory nodes as per FIG. 2 does not really show any operational advantage for Application type B. Further, as mentioned earlier, in order to exploit version B of the multicast driver device 3 for queuing many multicast cells relating to that same multicast group (whereby multicast cell queuing per multicast group is integrated within the multicast driver device 3 itself, thus avoiding multicast cell queuing per multicast group outside of the multicast driver device 3), each row of the multicast driver device 3 needs to be supplemented with an additional linked-list memory word (pointing to the next row in list), called Next Multicast Cell Link address'

(NMCLA), which allows to manage the correct queuing sequence of multicast cells (i.e. rows where they are queued) for each multicast group.

The potential advantage of integrating multicast cell queuing per multicast group within the multicast driver device 3 itself (instead of multicast cell queuing per multicast group outside of the multicast driver device 3) is two-fold. Faster move to the next multicast cell queued for the related multicast group, since the NMCLA ('Next Multicast Cell Link address') row address is directly read out from the row of the finishing active multicast cell (once its requests are all acknowledged). In comparison, queuing per multicast group outside of the multicast driver device 3 would require to identify the multicast group to which belongs this finishing active multicast cell, then select the start_of_list pointer of that multicast group list which gives the needed NMCLA ('Next Multicast Cell Link address') row address to be used, and read out the linked list memory at that address to update this start_of_list pointer with the read NMCLA ('Next Multicast Cell Link address') row address. Accordingly, no start_of_list pointer per multicast group is needed, and only one end_of_list pointer per multicast group is used as context data outside of the device (for adding a new multicast cell to the related multicast queue integrated within the multicast driver device 3).

A final remark is that embodiments of the present invention are described above in terms of functional blocks. From the functional description of these blocks, given above, it will be apparent for a person skilled in the art of designing electronic devices how embodiments of these blocks can be manufactured with well-known electronic components. A detailed architecture of the contents of the functional blocks hence is not given.

While the principles of the invention have been described above in connection with specific apparatus, it is to be clearly understood that this description is made only by way of example and not as a limitation on the scope of the invention, as defined in the appended claims.

The invention claimed is:

1. A network-unit for handling multicast messages and comprising a multicast driver device, wherein the multicast driver device comprises memory nodes arranged in at least one of rows and columns, with each memory node comprising at least one memory element for memorizing at least one state of the memory node,
   wherein there are M×N memory nodes arranged in M rows and N columns, with a row of N memory nodes indicating a first destination port being used for a multicast cell/group, and with a column of M memory nodes requesting a generation of a multicast copy for the first destination port, and
   wherein at least one memory node comprises an engagement line, an unavailability line and an identification line per row; and a request line, an acknowledgement line and a selection line per column.

2. The network-unit as defined in claim 1, wherein the request line is active and indicates a request for the generation of the multicast copy for the destination port corresponding to a column of the at least one memory node, if the engagement line is active and the at least one memory element is active.

3. The network-unit as defined in claim 2, wherein if the acknowledgement line is active, the engagement line is active and the at least one memory element is active, the memory element is reset.

4. The network-unit as defined in claim 1, wherein the memory element memorizes a state indicating a destination port being used for a multicast cell/group.

5. The network-unit as defined in claim 1, wherein a further memory element indicates a state requesting a generation of a multicast copy for a destination port.

6. The network-unit as defined in claim 1, wherein at least one memory node further comprises:
   an in-progress or busy line per row.

7. The network-unit as defined in claim 6, wherein at least one memory node further comprises:
   a request-acknowledged line per row; and
   an enforce-multicast-cell/group-priority line per column.

8. The network-unit as defined in claim 2, wherein the unavailability line is active and indicates a row corresponding to the at least one memory node is unavailable, if the at least one memory element is active and the request line is active.

9. The network-unit as defined in claim 2, wherein the identification line is active and indicates the column of the at least one memory node is selected for identification, if the selection line is active and the engagement line is active and the at least one memory element is active.

10. A computer-readable medium storing a program for executing a method, the method comprising memorizing at least one state of at least one memory node of memory nodes arranged in at least one of rows and columns,
    wherein there are M×N memory nodes arranged in M rows and N columns, with a row of N memory nodes indicating a destination port being used for a multicast cell/group, and with a column of M memory nodes requesting a generation of a multicast copy for the destination port, and
    wherein at least one memory node comprises an engagement line, an unavailability line and an identification line per row, and a request line, an acknowledgement line and a selection line per column.

11. A multicast driver device for use in a network-unit for handling multicast messages, wherein the multicast driver device comprises memory nodes arranged in at least one of rows and columns, with each memory node comprising at least one memory element for memorizing at least one state of the memory node,
    wherein there are M×N memory nodes arranged in M rows and N columns, with a row of N memory nodes indicating a destination port being used for a multicast cell/group, and with a column of M memory nodes requesting a generation of a multicast copy for the destination port, and
    wherein at least one memory node comprises an engagement line, an unavailability line and an identification line per row, and a request line, an acknowledgement line and a selection line per column.

12. A method for driving the handling of multicast messages, wherein the method comprises memorizing at least one state of at least one memory node of memory nodes arranged in at least one of rows and columns,
    wherein there are M×N memory nodes arranged in M rows and N columns, with a row of N memory nodes indicating a destination port being used for a multicast cell/group, and with a column of M memory nodes requesting a generation of a multicast copy for the destination port, and
    wherein at least one memory node comprises an engagement line, an unavailability line and an identification line per row, and a request line, an acknowledgement line and a selection line per column.

* * * * *